July 17, 1956     R. L. HOLM ET AL     2,755,043
SEAT BELT CONNECTING LINK
Filed Nov. 17, 1955     3 Sheets-Sheet 1
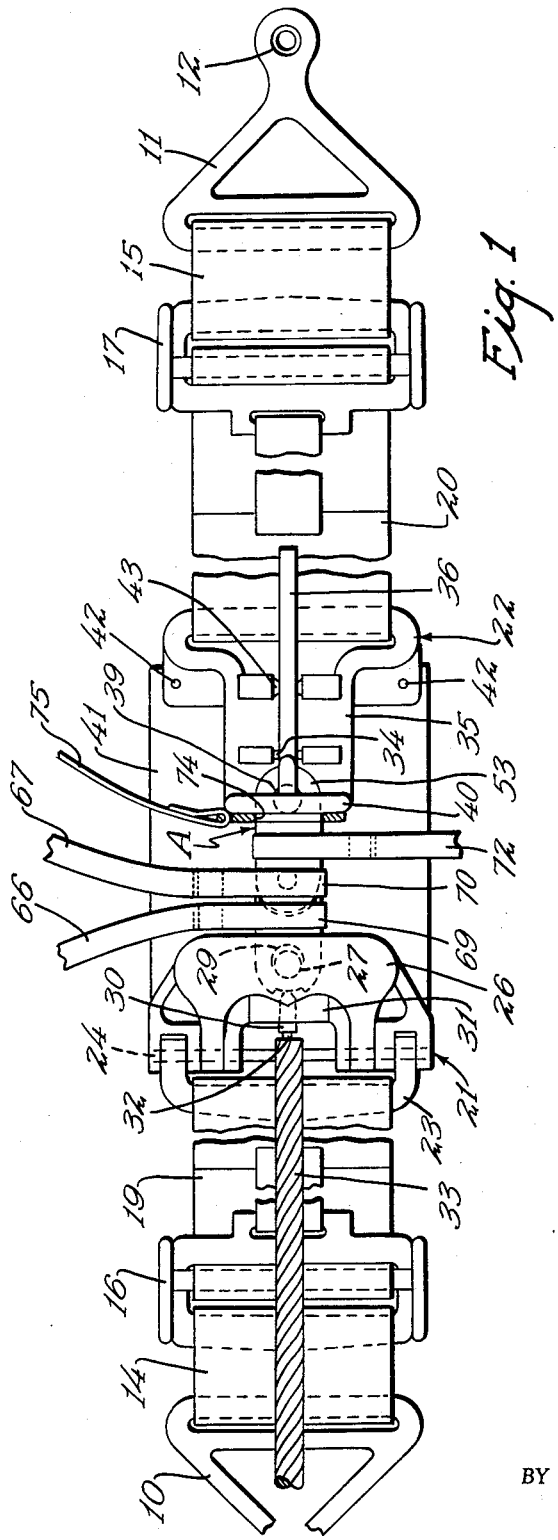
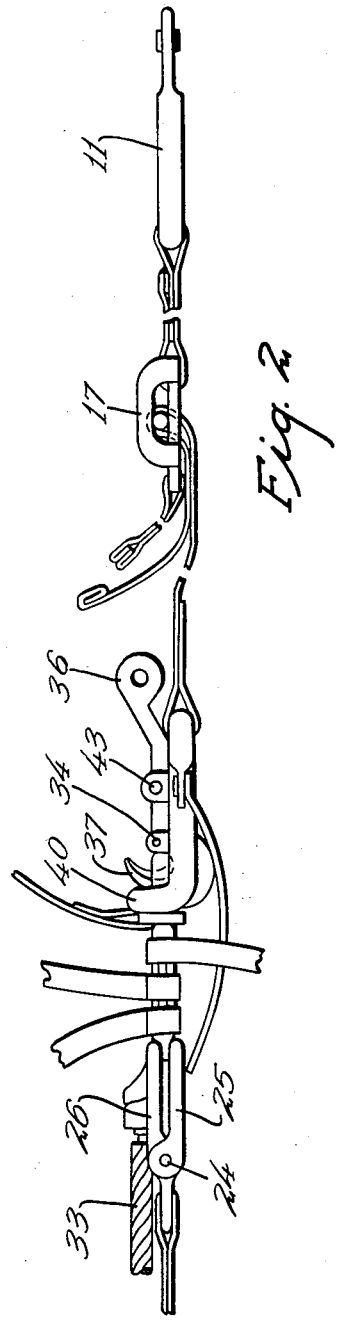
INVENTOR
Donald W. Martin
Ralph L. Holm
BY
ATTORNEY July 17, 1956 R. L. HOLM ET AL 2,755,043
SEAT BELT CONNECTING LINK Filed Nov. 17, 1955 3 Sheets-Sheet 2

INVENTOR
Donald W. Martin
Ralph L. Holm
BY
ATTORNEY

July 17, 1956  R. L. HOLM ET AL  2,755,043
SEAT BELT CONNECTING LINK

Filed Nov. 17, 1955  3 Sheets-Sheet 3

INVENTOR
Donald W. Martin
Ralph L. Holm
BY
ATTORNEY

United States Patent Office 2,755,043
Patented July 17, 1956

2,755,043

SEAT BELT CONNECTING LINK

Ralph L. Holm, Minneapolis, and Donald W. Martin, St. Paul, Minn.

Application November 17, 1955, Serial No. 547,449

9 Claims. (Cl. 244—122)

This invention relates to an improvement in hinged link connector for seat belts and deals particularly with a seat belt connector used in combat planes and the like.

In airplanes used in combat service it is occasionally necessary for the pilot to eject himself from the plane when the plane has become disabled. In a previously filed application for quick detachable coupler Serial No. 407,825 filed February 3, 1954, a detachable connector for a seat belt was described. In this previously filed application a rigid link was provided connecting the two ends of the seat belt and this link was arranged to provide space so that body holding straps could be looped thereover and held in place as long as the belt was connected. One end of the link was connected to a manually operable latch or buckle and the arrangement was such that as the pilot entered the plane, he could loop the body holding straps and the parachute clip which automatically operated his parachute mechanism to this belt before securing the manual buckle or latch. The other end of the link was connected to an automatically releasable latch which was capable of operation in an emergency to release the link to permit the various straps to slide from the link. The parachute clip remained attached to the structure in the event the seat belt was automatically released.

Certain difficulties were found with this type of construction. In some instances straps which encircle the upper portion of the body, usually over the shoulders, were looped over the link. Other anchoring straps holding the lower portion of the body to the seat were also looped over the link. When the link was automatically released, the upward pull on certain of the straps acted against the operation of the pull upon others of the straps making the release of all of the straps difficult.

An object of the present invention is to avoid this previous difficulty and to simplify the automatic release of the various body holding straps from the belt connecting link. In order to accomplish the desired result, the link is hinged intermediate its ends so that the released end of the link can pivot either upwardly or downwardly. As a result a pull upon the link would act to pivot the free end of the link to simplify the detachment of the various straps from the link.

These and other objects and novel features of the present invention will be more clearly and fully set forth in the following specification and claims.

In the drawings forming part of the specification:

Figure 1 is a diagrammatic view of the seat belt stretched out in flat form.

Figure 2 is a side elevational view of the belt shown in Figure 1.

Figure 3:
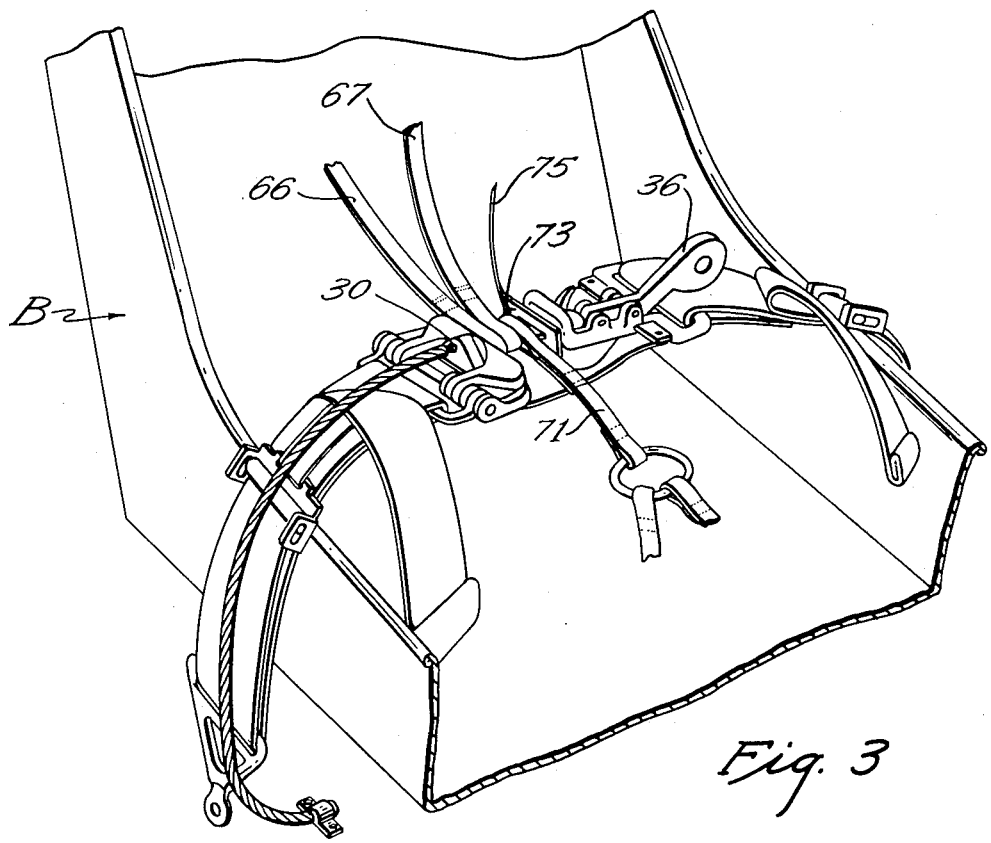
Figure 3 is a perspective view of the seat belt associated with a seat.

The general combination of parts is best illustrated in Figure 1 of drawings. In this figure a pair of anchoring members 10 and 11 are provided which are designed to be hingedly attached to a fixed portion of the seat or seat frame by means extending through apertures such as 12. These anchoring members 10 and 11 are securely anchored to ends of anchoring belts 14 and 15 respectively. The other ends of the anchoring belts 14 and 15 are secured to belt connectors 16 and 17. The divided seat belt also includes belt sections 19 and 20 respectively which are connected to the belt connector 16 and 17 and which are designed to extend over or about the body of the pilot. These elements are not described in detail as they are in common useage at the present time.

An automatically releasable device 21 is connected to the seat belt portion 19. A manually releasable buckle or attachment indicated in general by the numeral 22 is attached to the end of the seat belt portion 20. The members 21 and 22 are similar to those illustrated in a co-pending application Serial No. 303,284 naming Martin and Holm as inventors and filed on August 8, 1952. A hinged link indicated in general by the letter A acts to connect the automatically releasable member 21 and the manual latch or buckle 22 and it is this link which forms the important feature of the present invention.

The automatically releasable device 21 includes a generally U-shaped bracket 23 which is hingedly connected by a pivot 24 to the body portion 25 of the automatic release element. The pivot 24 also connects to the latch body 25 a clamping plate 26 including a projection 27 designed to extend through an aperture 29 in one end of the link A. The clamping plate 26 is normally held from pivotal movement relative to the body of the automatic release mechanism by a trigger pin 30 which extends through an upwardly projecting portion 31 on the base plate 25 and into the clamping plate 26. Under normal conditions of use, the pin 30 maintains the link A connected to the automatically releasable element 21.

The trigger pin 30 is connected by a flexible connecting element 32 which extends through a flexible cable 33 to an anchoring point remote from the seat. The flexible member 32 may be operated either by anchoring the end of this member to a fixed portion of the plane body when the seat is ejected from the plane or may be operated by any other source of power. When actuated, the trigger pin 30 is withdrawn from the clamping plate 26 allowing this plate to hinge upwardly and to release the link A. The projection 27 is preferably tapered in such a manner that a longitudinal pull on the link A will automatically swing the clamping plate 26 into open position.

The manually operable latch or buckle 22 is pivotally supported at 34 to the base plate 35 of the latch, which base plate is connected to the belt section 20. As is indicated in Figure 2 of the drawings, the pivotal latch 36 is provided with a hook end 37 which may be extended through an aperture 39 in the link A. As is also indicated in the drawings, a loop or bridging member 40 extends over the end of the link A attached to the manual latch 22 so as to hold the link attached to this latch unless manually released. A wide, flexible bearing panel 41 is secured at 42 to the body of the manual latch 22 and the pressure of the body against this panel normally holds the latch member 36 in link engaging position.

Spring urged members 43 supported by the body portion 35 of the manual latch 22 also tends to hold the latch member 36 in belt engaging position. The latch member 36 may, however, be hinged out of engagement with the link when it is desired to manually disconnect the seat belt.

The link A is constructed as is best indicated in Figures 4 through 7 of the drawings. In general, the link A includes two pivotally connected members 44 and 45 which are pivotally connected by a pivot 46. Means are provided for limiting the relative rotative movement between these parts for a purpose which will be later described in detail.

Figure 5:
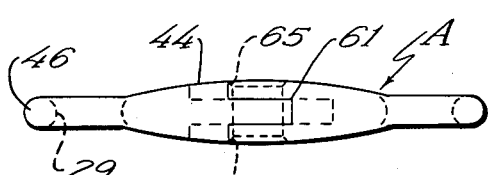
Figure 5 is an edge view of the link shown in Figure 4.
Figure 6:
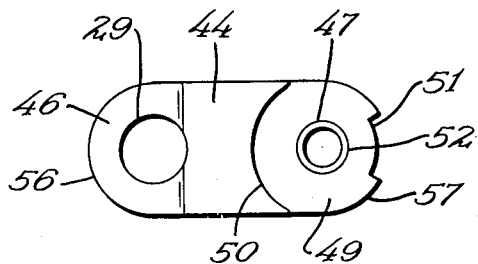
Figure 6 is an elevation view of one link member.

The link member 44 is constructed as is best illustrated in Figure 6 of the drawings. The free end 46 of this link member 44 is of substantially uniform thickness and contains the aperture 29 through which the projection 27 of the automatic release mechanism 21 extends. The edges of this end 46 and of the aperture 29 are rounded so that the projection 27 may easily be inserted or withdrawn. As is indicated in Figure 5 of the drawings, the link member 44 gradually increases in thickness from the end 46 to a point near the pivot aperture 47. The pivot end 49 which is pivotally connected to the link member 45 is of uniform thickness and generally circular in shape, a shoulder 50 of arcuate form separating the relatively thin attaching end 49 from the thickened portion of the link immediately adjacent to this attaching end 49. An arcuate notch 51 is provided in the periphery of the attaching portion 49, the notch 51 preferably extending equally on opposite sides of the longitudinal axis of the link member 44. A bushing or bearing member 52 is inserted into the aperture 47 to provide a bearing surface against which the pivot pin 46 may rotate.

Figure 7:
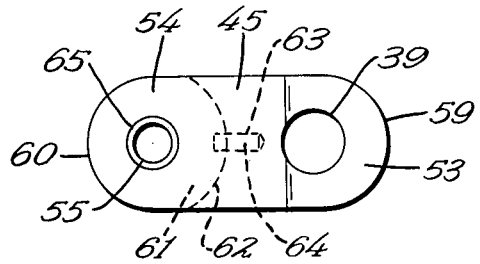
Figure 7 is an elevation view of the other link member.

The link member 45 is constructed as is best illustrated in Figure 7 of the drawings. This link portion 45 is provided with a flattened end 53 in which the aperture 39 is located. The edges of the link end 53 as well as the edges of the aperture 39 are rounded to permit the easy insertion and withdrawal of the hook end 37 of the manually operated latch member 36. From the flattened end 53, the link member 45 gradually increases in thickness until it is of greatest thickness at the point 54 which is transversely aligned with the center of the pivot aperture 55. From this point to the extremity of the link, the link member 45 gradually decreases in thickness.

The rounded ends 56 and 57 of the link member 44 are coaxial with the axes of the apertures 29 and 47 respectively. In a similar manner the rounded ends 59 and 60 of the link member 45 are concentric with the apertures 39 and 55 respectively. Thus the two link members may pivot relative to one another and also may pivot within certain limits with respect to the manually operable latch member and the projection of the automatically releasable member to which the link is normally attached. A notch 61 is provided between the upper and lower sides of the link member 45 so as to provide a bifurcated end for receiving the pivot end 49 of the link member 44. The notch 61 is provided with a curved inner extremity 62 which follows the curvature of the rounded end 57 of the link 54. An axial recess 63 is provided at the base of the notch 61 along the longitudinal axis of the link member 45. A pin 64 is mounted in the recess 63 and is designed to extend a short distance into the notch. This pin 63 is designed to extend into the arcuate notch 51 of the link member 44 so as to limit the relative pivotal movement between these link members.

The upper and lower ends of the pivot aperture 55 are chamfered as is indicated at 65 and the pivot 46 is riveted over at its ends to clamp the two parts of the link together. The bushing or bearing 52 is slightly longer than the thickness of the pivot end 49 of the link 44 and as a result the end 49 may pivot freely in the notch 61 of the link member 45. This is important as excessive friction between the two link members might well prevent the proper operation of the link.

Figure 4:
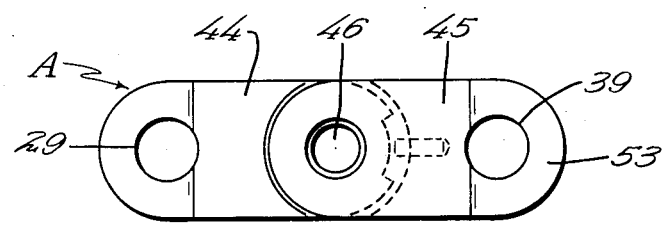
Figure 4 is an elevation view of the link detached from the latches.

When the two link members are connected together as in Figures 4 and 5 of the drawings, it will be noted that the entire body of the link is smooth and rounded and presents no shoulders or projections against which the various body encircling straps may catch. The smooth unbroken outer surface of the link is of extreme importance as the link must function in an extremely short period of time to release the various body encircling straps in an emergency. Figures 1 and 3 of the drawings indicate the general arrangement of parts when the seat belt is fastened. The specific strap arrangement illustrated may be varied somewhat as in some instances only shoulder straps are used and in other instances the number of straps employed may vary to some extent. Accordingly the showing in Figures 1 and 3 is only suggestive of a means in which the link may be employed, it being understood that the specific arrangement may be varied.

As indicated in these figures, a pair of body encircling straps designed to encircle the upper portion of the body are indicated at 66 and 67, these straps being provided with loop ends 69 and 70 respectively. A lower body encircling strap 71 having a looped end 72 is provided. The looped end of these body encircling straps are placed to encircle the link A between the automatically releasable latch 21 and the manual latch 22. Preferably the straps which extend over the upper portion of the body are in side-by-side relation encircling one end of the link A while the strap or straps such as 71 encircling lower portions of the body are arranged to encircle the other end of the link A. This arrangement is not entirely essential but permits quicker release of the various straps.

A parachute clip 73 also encircles the link member 45. The clip 73 is provided with an aperture 74 therethrough which is of sufficient size to encircle the flattened end portion 53 of the link member 45 but which is of insufficient size to slide over the thickened portion of this link. Accordingly, while the loop ends of the straps 66, 67 and 71 are of sufficient size so that these straps can slide easily from either end of the link A, the parachute clip 73 can be detached only from one end of the link and when the manually operable latch member 63 is pivoted. This is also important to the proper operation of the apparatus.

In the normal operation of the structure, the pilot sits in the seat B and places the ends of the seat belt in his lap. He then places the straps encircling one portion of the body over the free end of the link member 45 so as to encircle the link A. In the arrangement illustrated, the straps 66 and 67 extending over the shoulder of the aviator are first looped about the link A.

The straps encircling the other portion of the body are next placed on the link A. For example, the looped end 72 of the belt 71 encircling a portion of the lower part of the body is placed over the free end of the link member 45. The parachute clip 73 is next placed to enclose or encircle the attaching end 53 of the link member 45. When all of these elements have been assembled on the link, the hook end 37 of the manually operable latch member 36 is inserted through the aperture 39 in the link member 45 and the harness is then in fully assembled position.

In normal operation, at the completion of a flight, the manually operable latch member 36 is swung into open position, and the various elements are disassembled from the link A. The parachute clip 73 is first removed and then the straps 66, 67 and 71 may be slipped over the free end of the link member 45.

In the event the airplane is disabled in flight, it is necessary that the aviator abandon the plane in midair and depend upon his parachute to provide a safe landing upon the ground. In such cases, it is usual practice to provide an ejecting mechanism which ejects the seat B from the plane while the pilot is still occupying the seat. At some point during this operation, the automatic release mechanism 21 must open so that the aviator will be free of the seat. This is accomplished by providing a pull upon the flexible member 32, this pull being effective either by the attachment of the flexible member 32 to a fixed portion of the plane or by other suitable means such as by an explosive charge. As soon as the trigger pin 30 has been released, the clamping plate 26 will swing into open position disconnecting the divided ends of the seat belt. At the same time it is desirable that the body encircling straps 66, 67 and 71 be released from the link A in a minimum of time so that the body will be completely free of the seat. It is also necessary that the clip 73 remain attached to an end of the seat belt, as the parachute clip 73 is connected by a flexible member such as 75 to a mechanism which starts the parachute opening means in operation. Usually, the flexible member 75 is connected to a timing mechanism or to a pressure controlled mechanism which opens the parachute after a predetermined time interval or when the aviator reaches a predetermined elevation above the ground. This mechanism is not shown in the present application as it is well known in the art.

Figure 8:
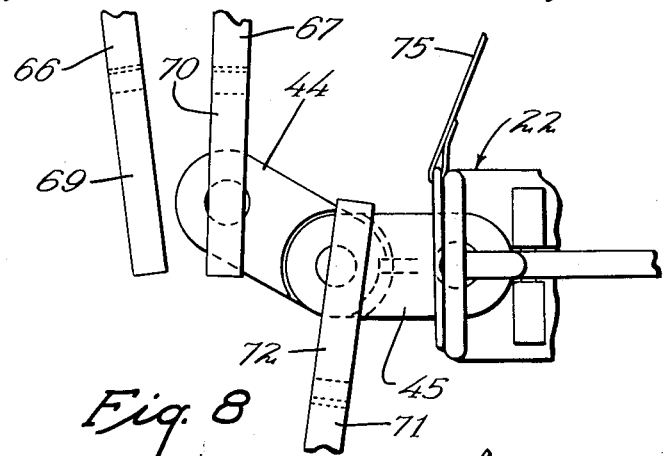
Figure 8 is a diagrammatic view showing the link action.
Figure 9:
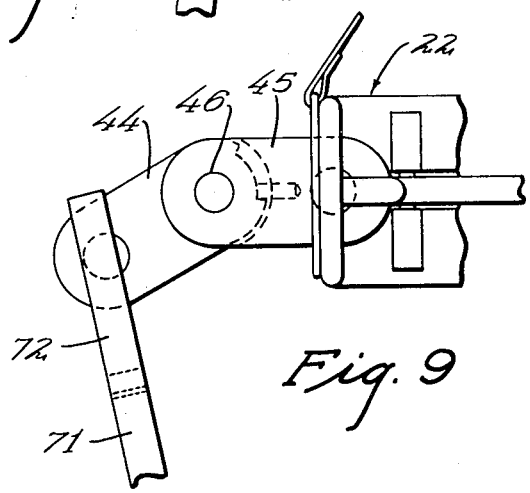
Figure 9 is a view similar to Figure 8 showing the link members in a different position.

The center hinge in the link A is of considerable importance in permitting the various body encircling straps to be quickly released. Figures 8 and 9 illustrate diagrammatically how the release is effected. When there are both upper and lower body encircling straps attached to the link, there is a pull in opposite directions upon the link which would normally prevent a rigid link from pivoting in either direction. However, with the pivoted link construction illustrated, the upward pull of the straps 66 and 67 causes the link member 44 to pivot upwardly relative to the link member 45 in the manner illustrated in Figure 8 of the drawings. Accordingly, these straps are quickly released from the link. The downward pull of the strap 71 then quickly swings the link member 44 in the opposite direction as indicated in Figure 9 of the drawings so as to quickly detach the strap 71. All of this operation may take place in an extremely short period of time due to the free swinging movement between the link members so that the various straps may be detached more readily than is possible with the use of a single rigid link.

In accordance with the patent statutes we have described the principles of construction and operation of our hinged link connector for seat belts, and while we have endeavored to set forth the best embodiment thereof, we desire to have it understood that obvious changes may be made within the scope of the following claims without departing from the spirit of the invention.

We claim:

1. In combination, a safety harness including a divided seat belt, a manually operable latch connected to one end of said seat belt, an automtically releasable latch secured to the other end of said seat belt, a link normally connected to said automatically releasable latch and detachably connected to said manually operable latch, a series of body encircling straps having ends looped about said link and removable from either end thereof, means operable to release said automatically releasable latch, said link comprising a pair of link members hingedly connected together.

2. The combination described in claim 1 and including a parachute clip attachably and detachably secured to the end of said link detachably connected to manually operable latch and not slidable over said link.

3. The combination of claim 1 and in which said link is of greater periphery at a point between its ends than at its ends, and including a parachute clip engageable upon an end of said link but not slideable over said portion of greater periphery.

4. The structure described in claim 1 and in which ends of the link members are hingedly connected, and the other ends of the link members are apertured, and in which the axes of the apertures are substantially parallel to the axis of the hinge connection.

5. A seat belt latch arrangement for connecting the ends of a divided seat belt, the latch arrangement including a manually operable latch adapted to be connected to one seat belt end, an automatic release latch adapted to be connected to the other seat belt end, and a link having ends connectable to said latches, said link being normally connected to said automatic release latch, said link including two link members pivotally connected together, and means for automatically releasing said link from said automatic release latch.

6. The structure described in claim 5 and in which said link is thicker intermediate its ends than at its ends, and is free of protuberances.

7. The structure described in claim 5 and in which the link members are equipped with means for limiting relative pivotal movement therebetween.

8. A seat belt link including a pair of link members, one of said link members having an arcuate bifurcated end, the other of said members having an arcuate end engageable into said bifurcated end, a pivot concentric with said arcuate ends and connecting said link members, said connected link members having flat arcuate outer ends having apertures therethrough, said link members increasing in thickness to the point of pivotal connection and having smooth surfaces.

9. The structure described in claim 8 and including cooperable means on said link members to limit relative pivotal movement.

References Cited in the file of this patent

UNITED STATES PATENTS

| | | |
|---|---|---|
| 1,193,135 | Gerstner | Aug. 1, 1916 |
| 2,105,480 | Hoffman | Jan. 18, 1938 |